United States Patent
Schnetzka et al.

[11] Patent Number: 5,850,160
[45] Date of Patent: *Dec. 15, 1998

[54] GATE DRIVE CIRCUIT FOR AN SCR

[75] Inventors: Harold R. Schnetzka; Dean K. Norbeck; Donald L. Tollinger, all of York, Pa.

[73] Assignee: York International Corporation, York, Pa.

[21] Appl. No.: 877,623

[22] Filed: Jun. 18, 1997

Related U.S. Application Data

[60] Provisional application No. 60/020,336 Jun. 19, 1996.

[51] Int. Cl.$^6$ .................................................. H03K 17/72
[52] U.S. Cl. .......................... 327/438; 327/453; 327/582
[58] Field of Search .................................. 327/438, 440, 327/442, 445, 447, 451, 453, 465, 468, 475, 582

[56] References Cited

U.S. PATENT DOCUMENTS

| | | |
|---|---|---|
| 3,757,141 | 9/1973 | Paisson et al. . |
| 3,793,537 | 2/1974 | Stringer . |
| 4,417,156 | 12/1983 | Fukui et al. . |
| 4,554,463 | 11/1985 | Norbeck et al. ........................ 307/252 |
| 5,654,661 | 8/1997 | Kammiller ............................... 327/438 |

FOREIGN PATENT DOCUMENTS

0669701 A1  8/1995  European Pat. Off. .

Primary Examiner—Timothy P. Callahan
Assistant Examiner—Jeffrey Zweizig
Attorney, Agent, or Firm—Finnegan, Henderson, Farabow, Garrett & Dunner, L.L.P.

[57] ABSTRACT

A gate drive circuit for a silicon controlled rectifier (SCR) connected in an a-c power circuit includes a voltage divider network connected between a d-c voltage source and the SCR for developing a varying voltage on a control node, depending upon whether the anode-to-cathode a-c voltage of the SCR is positive or negative. A first switching transistor, responsive to the control node voltage, controls conduction of a second switching transistor connected between the d-c voltage source and a voltage regulated driver circuit. In this way, a constant drive current is applied to the SCR gate only while the anode-to-cathode voltage of the SCR is positive.

11 Claims, 4 Drawing Sheets

GATE DRIVE CIRCUIT FOR AN SCR

BACKGROUND OF THE INVENTION

This application is based on United States Provisional application, Ser. No. 60/020,336 titled, "Liquid-Cooled Variable Speed Drive for Chiller Compressor Motor" and filed Jun. 19, 1996, which is herein incorporated by reference.

A. Field of the Invention

This invention relates generally to a gate drive circuit for a silicon controlled rectifier (SCR). More particularly, this invention relates to a constant current gate drive circuit controlled by the a-c anode-to-cathode voltage of an SCR.

B. Description of the Related Art

Silicon controlled rectifiers are often used in control systems that regulate the power transferred from an a-c source to a d-c load circuit. FIG. 1 is a simplified diagram of such a control system, showing an SCR 10 coupled in series with a load 20 and an a-c power supply 30. FIG. 1 also illustrates a conventional gate drive circuit for gating on an SCR 10 using a d-c voltage source V, a switch S, and a series resistor R. When switch S closes, current will flow through resistor R and the gate-to-cathode conduction path of SCR 10, triggering SCR 10 into conduction when it is forward biased.

When the voltage of a-c power supply 30 is of a polarity (e.g. positive half-cycle) such that current can flow through SCR 10 in the direction from its anode to its cathode terminal (arrow 12), power supply 30 will energize load 20 while the gate drive circuit triggers SCR 10 into conduction. Since power supply 30 is an a-c voltage source, current will flow through load 20 and SCR 10 only during the positive half cycles of the a-c voltage causing SCR 10's anode-to-cathode voltage to be positive. In addition, the power dissipated in the SCR increases excessively when the gate drive circuit is enabled during they negative half cycles of the a-c power supply 30. Therefore, power consumption may be reduced by providing gate drive to SCR 10 only during the positive half cycles of a-c power supply 30.

To achieve this, the above gating circuit requires a separate control circuit for turning the gate drive current on and off in synchronism with the a-c source frequency. In other words, the above gating circuit requires a separate controller to control the timing of the gate current supplied to SCR 10 (e.g., by opening and closing switch S), such that SCR gate drive is produced only during each positive half cycle.

SUMMARY OF THE INVENTION

The objects of circuits consistent with the present invention are to automatically and efficiently control the on and off timing of gate drive current in response to the a-c anode-to-cathode voltage of an SCR. In this way, the gate drive current may be turned off while the anode-to-cathode voltage of the SCR is negative and turned on while the anode-to-cathode voltage of the SCR is positive.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

A gate drive circuit consistent with the present invention, for gating a silicon controlled rectifier (SCR) connected in an a-c power circuit, includes a d-c voltage source. A driver circuit produces a gate drive current, when connected to the d-c voltage source, to trigger the SCR into conduction. Finally, a switching circuit, including a switch connected between the d-c voltage source and the driver circuit and a voltage divider network connected between the d-c voltage source and the SCR, operates to control the switch such that the switch is closed when the anode-to-cathode a-c voltage reaches a positive value and the switch is open when the anode-to-cathode voltage reaches a negative value.

A gate drive circuit consistent with the present invention, for gating a silicon controlled rectifier (SCR) connected in an a-c power circuit, includes a d-c voltage source. A driver circuit produces a gate drive current, when connected to the d-c voltage source, to trigger the SCR into conduction. Finally, a switching circuit, including a voltage divider network connected between the d-c voltage source and the SCR, controls the connection of the driver circuit to the d-c voltage source such that the driver circuit is connected to the d-c voltage source when a control node of the voltage divider network senses that an anode-to-cathode voltage of the SCR reaches a positive value and controls the disconnection of the driver circuit from the d-c voltage source such that the driver circuit is disconnected to the d-c voltage source when the anode-to-cathode voltage reaches a negative value.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

Introduction

Gate drive circuits consistent with this invention provide continuous gate drive current to an SCR while the anode-to-cathode a-c voltage across the SCR is positive. By sensing the SCR's anode-to-cathode voltage and turning off the gate drive current each time this a-c voltage swings sufficiently negative, the need to separately control the timing of the gate drive current is eliminated. To this end, the gating circuit includes two semiconductor transistors that essentially act as switches. The states of these transistors are controlled by a resistor-diode voltage divider network connected across the anode and cathode terminals of the SCR. When the anode-to-cathode a-c voltage swings sufficiently negative, the voltage divider network causes the transistors to change states, thus switching gate drive current to the SCR off.

Circuit Structure

Figure 1:
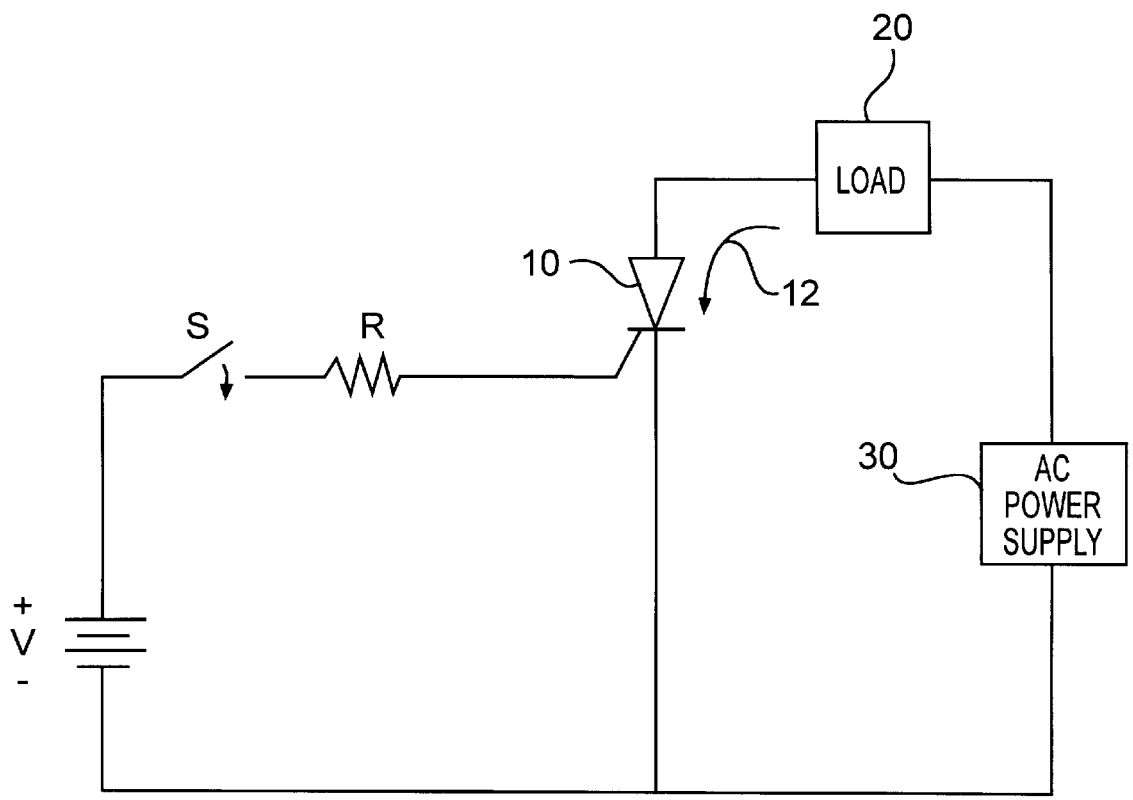
FIG. 1 is a diagram of a prior art current gating circuit.
Figure 2:
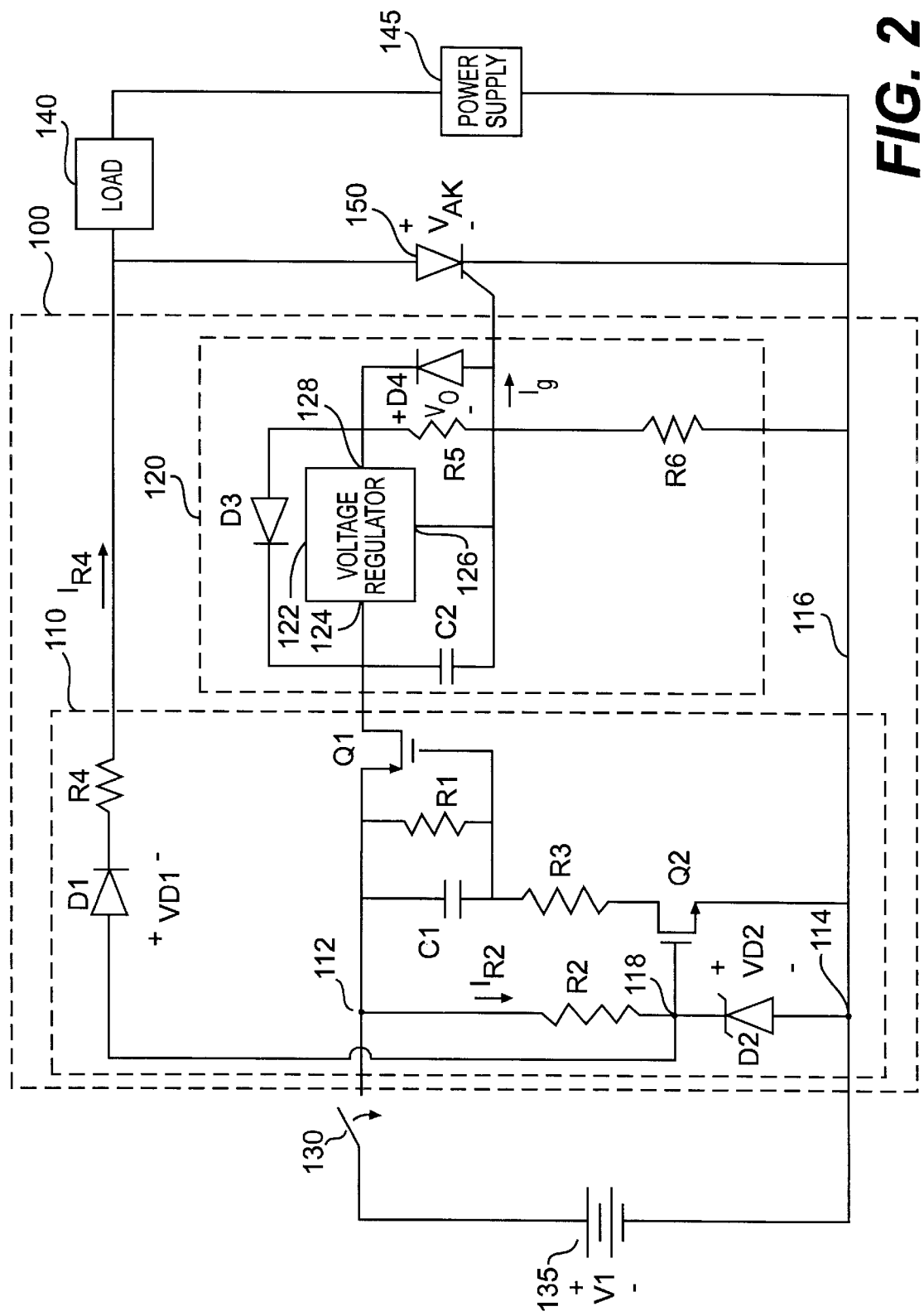
FIG. 2 is a diagram of a constant current gating circuit consistent with the present invention.

FIG. 2 illustrates a constant current gate drive circuit 100 consistent with the present invention, which includes a switching circuit 110 and a driver circuit 120. During the on (closed) state of a relay 130, switching circuit 110 receives a d-c voltage V1 from a voltage source 135. In response, driver circuit 120 produces a gate drive current Ig to an SCR 150, connected in series with a load 140 and an a-c power supply 145. Although circuits consistent with the present invention are preferably used with an SCR, other types of switches, such as a power transistor or a gate turn-off switch, may be used in place of the SCR.

Switching circuit 110 includes a voltage divider network consisting of diodes D1 and D2 and resistors R2 and R4. Resistor R2 is connected from a positive input terminal 112 of switching circuit 110 to a control node 118. Node 118 serves as the point for sensing the anode-to-cathode voltage of SCR 150 and is connected to the anode of diode D1 and to the cathode of diode D2. One end of resistor R4 is connected to the cathode of diode D1, while its other end is connected to the anode of SCR 150. The anode terminal of diode D2 is connected to a bus 116, which, in turn, connects a negative input terminal 114 of the switching circuit (and the negative terminal of voltage supply 135) to the cathode of SCR 150.

As will be described below, the voltage divider network functions to turn on and off MOSFETs Q1 and Q2. To this end, the gate and source terminals of MOSFET Q2 are connected, respectively, to control node 118 and negative input terminal 114 of switching circuit 110. The source terminal of MOSFET Q1 is connected to positive input terminal 112 and its gate terminal is connected to the drain terminal of MOSFET Q2 through resistor R3. In addition, connected between the source and gate terminals of MOSFET Q1 is a parallel combination of capacitor C1 and resistor R1. The drain terminal of MOSFET Q1 is connected to driver circuit 120. In circuits consistent with the present invention, MOSFET Q1 is preferably a p-type transistor and MOSFET Q2 is preferably an n-type transistor. However, other types of semiconductor devices, such as bipolar junction transistors, may be used for devices Q1 and Q2.

Driver circuit 120 further includes a voltage regulator 122, a capacitor C2, resistors R5 and R6, and diodes D3 and D4. The drain of MOSFET Q1 is connected to the input terminal 124 of voltage regulator 122. Capacitor C2 is connected between voltage regulator 122's input terminal 124 and common terminal 126 of voltage regulator 122, while resistor R5 is connected between voltage regulator 122's common terminal 126 and output terminal 128. In addition, the end of resistor R5 connected to common terminal 126 is also connected to the gate terminal of SCR 150. The cathode and anode terminals of diode D3 are respectively connected to input terminal 124 and output terminal 128 of voltage regulator 122. The anode and cathode terminals of diode D4, on the other hand, are respectively connected to common terminal 126 and output terminal 128 of voltage regulator 122. Finally, resistor R6 is connected across the gate and cathode terminals of SCR 150.

Circuit Operation

The operation of a constant current gate drive circuit consistent with the present invention will now be described with reference to FIG. 2. As stated above, the operation of gate drive circuit 100 is dependent upon the polarity of the anode-to-cathode voltage of SCR 150 as determined by a-c power supply 145. For instance, when the polarity of a-c power supply 145 is positive, the anode-to-cathode voltage of SCR 150 will be positive as well. In this case, a sufficiently positive anode-to-cathode voltage renders diode D1 non-conductive, effectively removing the branch of the voltage divider network containing diode D1 and resistor R4 from control node 118. Therefore, the operation of the constant current gating circuit will first be discussed for the case when the anode-to-cathode voltage is sufficiently positive and diode D1 is thus reverse-biased (non-conductive).

To activate constant current gate drive circuit 100, relay 130 is closed to apply a voltage V1 across input terminals 112 and 114 of switching circuit 110. This applied voltage V1 causes a current to flow from terminal 112, connected to the positive terminal of voltage supply 135, through resistor R2 and zener diode D2 to bus 116. As well known in the art, when zener diode D2 turns on, its cathode-to-anode voltage VD2 will be clamped to its rated zener voltage Vz. In circuits consistent with the invention, Vz has a value of about 10 volts. As described above, while the SCR anode-to-cathode voltage is sufficiently positive, diode D1 is reverse-biased, and node 118 is effectively disconnected from the anode of SCR 150. Node 118 will therefore remain clamped at the voltage Vz.

If the turn-on voltage of MOSFET Q2 is less than Vz, it turns on when the SCR anode-to-cathode voltage is positive, and current will then flow through the parallel combination of capacitor C1 and resistor R1, resistor R3, and then to bus 116. This current flow produces a voltage drop across the source and gate terminals of MOSFET Q1, turning it on. Current will then initially flow through capacitor C2 and the gate-to-cathode conduction path of SCR 150. This produces a current spike at the leading edge of the gate current Ig, enabling fast turn-on of SCR 150. The amplitude of this current spike is limited by the internal resistance of MOSFET Q1 and voltage V1 of d-c voltage supply 135. As capacitor C2 charges toward the difference between voltage V1 and the voltage drop caused by the source-drain impedance of MOSFET Q1, voltage is applied across the input 124 and common 126 terminals of voltage regulator 122, placing it in an activated state.

Voltage regulator 122 may comprise an integrated circuit capable of producing a maximum current output substantially greater than that needed to drive SCR 150 into full conduction. Voltage regulators suitable for this purpose are known in the art, such as, for example, a Motorola MC7805CT. Voltage regulator 122 preferably maintains a constant d-c voltage Vo between output terminal 128 and common terminal 126 that is effective to drive a constant current through resistor R5 and to the gate of SCR 150. In drive circuits consistent with the invention, Vo is preferably 5 volts. The magnitude of the gate drive current Ig is determined by the output voltage specifications of voltage regulator 122 divided by the resistance of resistor R5. The value of this constant current to assure optimum gate drive for SCR 150 can then be readily achieved by choosing the appropriate resistance for resistor R5. The gate driving power can thus be closely matched to the power needed to reliably trigger and maintain SCR 150 in full conduction. Therefore, minimal power will be wasted in gate drive circuit 100; a substantial benefit in multiphase power circuits, resulting in a lower cost and a smaller size drive circuit 100.

As also shown in FIG. 2, driver circuit 120 further includes diodes D3 and D4, and resistor R6. Shunting diodes D3 and D4 protect voltage regulator 122 against reverse current flow. Resistor R6 provides a low impedance path between the gate and cathode terminals of SCR 150, shunting any excessive drive current away from the gate of SCR 150 when transistors Q1 and Q2 are in the off state.

As stated previously, the above operating description pertains to the circumstance when the anode-to-cathode voltage of SCR 150 is sufficiently positive, such that diode D1 is non-conductive. However, when the anode-to-cathode voltage of SCR 150 decreases to a value equal to Vz less the turn-on voltage for diode D1, diode D1 becomes conductive. This draws current from control node 118 through resistor R4 and the anode-cathode circuit of SCR 150 to bus 116. As the anode-to-cathode voltage of SCR 150 further decreases, the voltage on control node 118 decreases causing zener diode D2 to turn off and will eventually fall below the turn-on voltage of MOSFET Q2. When MOSFET Q2 ceases to conduct current, MOSFET Q1 is deprived of turn-on voltage, and it also goes non-conductive (e.g. turns off). Once MOSFET Q1 turns off, voltage regulator 122 shuts down, halting gate drive current to SCR 150 when transistors Q1 and Q2 are in the off state.

When the anode-to-cathode voltage is sufficiently negative during negative half cycles of source 145, MOSFET Q1 is non-conductive and no current can flow from d-c source 135 to voltage regulator 122. In addition, no current can flow from the d-c source through the voltage divider network, since diode D2 and SCR 150 are non-conductive. At the same time, consequently, constant current gate drive circuit 100 is extremely efficient, since it only consumes power when the constant gate drive current is being generated.

The following circuit analysis illustrates the operation of switching circuit 110. As described above, gate drive current Ig will be inhibited at the anode-to-cathode voltage of SCR 150 that causes VD2, the voltage at control node 118, to fall just below the turn-on voltage of MOSFET Q2. To start, the anode-to-cathode voltage VAK can be expressed as follows:

$$VAK = VD2 - VD1 - (I_{R4} \times R4) \quad (1)$$

where VD1 represents the anode-to-cathode voltage of diode D1.

The current $I_{R4}$ through resistor R4 will be the same as the current $I_{R2}$ through resistor R2 when the gate current is inhibited since diode D2 will be turned off. The current through resistor R2 can be expressed as follows:

$$V1 = (I_{R2} \times R2) + VD2 \quad (2)$$

Alternatively, $$I_{R2} = (V1 - VD2)/R2 \quad (3)$$

Since $I_{R2} = I_{R4}$, equation (3) can be substituted for $I_{R4}$ in equation (1). Making this substitution and solving equation (1) for VAK obtains the following equation:

$$VAK = VD2 - VD1 - (R4/R2) \times (V1 - VD2) \quad (4)$$

For the case when VAK is negative, VAK can be expressed as follows:

$$VAK = (R4/R2) \times (V1 - VD2) + VD1 - VD2 \quad (5)$$

Thus, since V1 and VD1 can be considered constant when zener diode D2 goes non-conductive, equation (5) shows that VD2 will decrease as VAK goes increasingly negative. The negative VAK voltage at which MOSFET Q2 turns off can be determined by appropriate selections of the R2 and R4 resistance values. For MOSFETs used in circuits consistent with the present invention, the gate-source turn-on voltage is normally between 3 and 5 volts. Substituting this turn-on voltage for MOSFET Q2 for VD2 in equation (5), the value for VAK at which the gate current Ig is inhibited can be determined. Furthermore, since MOSFET Q2 will remain off as VAK becomes even more negative (proceeds into a negative half cycle), the anode-to-cathode voltage at which gate current is inhibited by gate driving circuit 100 can be express as follows:

$$VAK \geq (R4/R2) \times (V1 - VD2) + VD1 - VD2 \quad (6)$$

where VAK is negative.

As VAK approaches a positive half cycle, MOSFET Q2 will turn on again when VAK reaches the value determined by equation (5). MOSFET Q2 will then remain on (to turn on MOSFET Q1 and voltage regulator 122) until it turns off in the manner described above.

Figure 3:
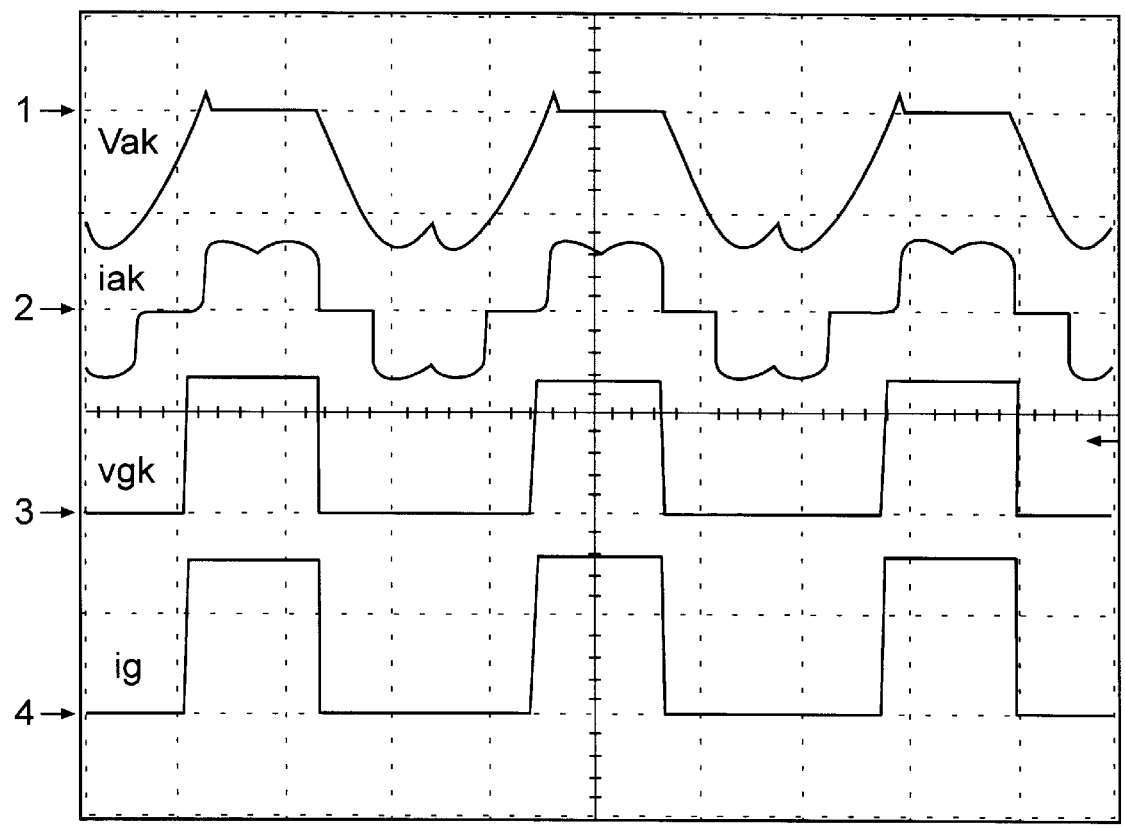
FIG. 3 is a waveform diagram which shows waveforms for various signals of the constant current gating circuit of FIG. 2.

FIG. 3 is a waveform diagram which shows representative waveforms for anode-to-cathode voltage VAK, current Iak through the anode-cathode circuit of SCR 150, gate-to-cathode voltage Vgk of SCR 150, and gate drive current Ig for SCR 150. As shown in FIG. 3, gate drive current Ig turns on or off when VAK reaches a sufficiently negative value, depending upon whether VAK is increasing or decreasing. The waveform for VAK shows that when SCR 150 is gated on by gate drive circuit 100, the anode-to-cathode voltage VAK is close to zero. At this value of VAK, diode D1 is reversed biased, thus allowing zener diode D2 to abruptly raise the control node 118 to the turn-on voltage of MOSFET Q2, such that constant gate drive current to the SCR can be maintained in the manner described above.

Figure 4:
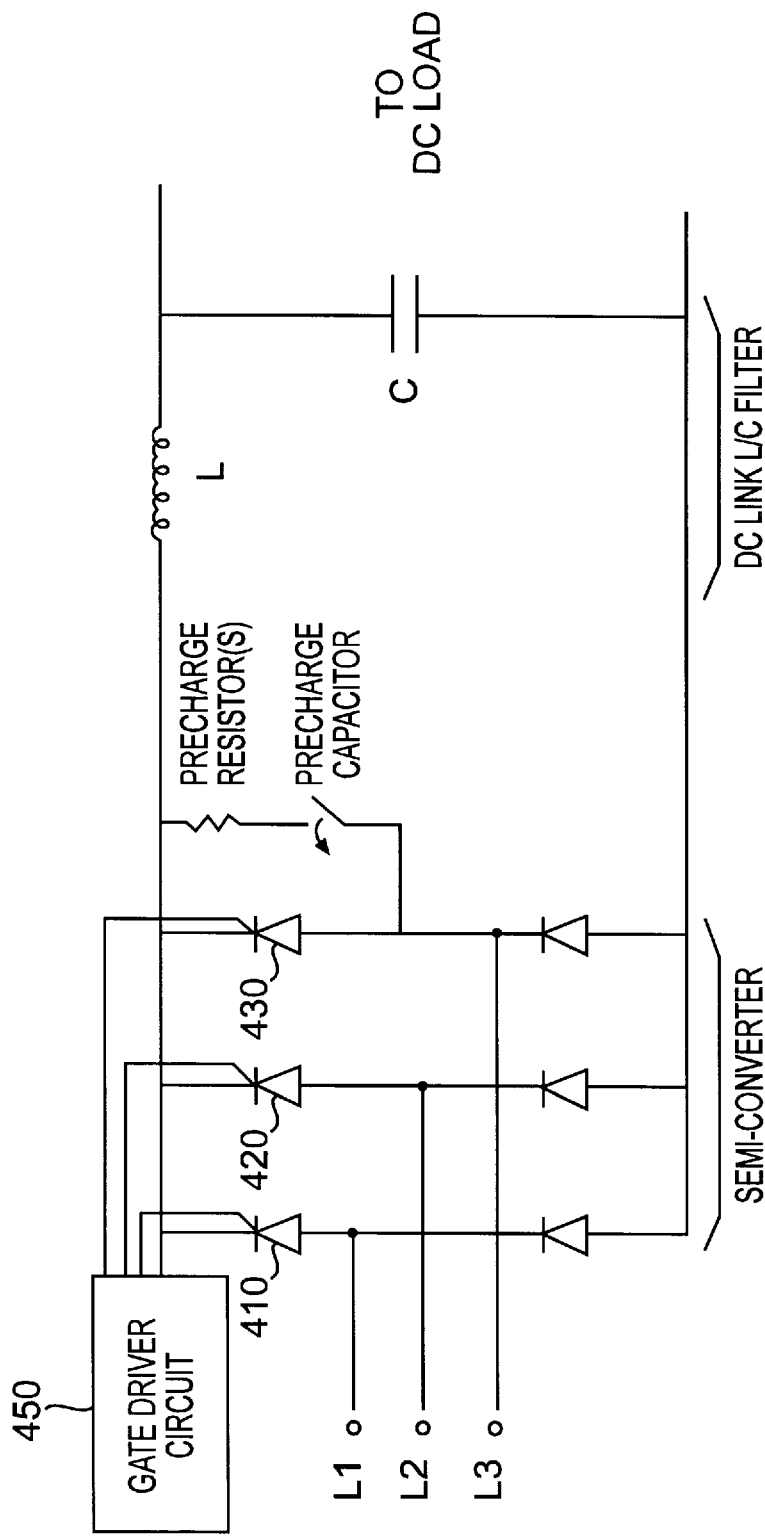
FIG. 4 is a diagram of a three-phase, full-wave semi-converter system using the circuit of FIG. 2.

FIG. 4 is a diagram of a three-phase, full-wave semi-converter system including, three SCRs 410, 420 and 430, connected to separate gate drive circuits commonly indicated by reference numeral 450. The three independent gate drive circuits, control the gate drives for SCRs 410, 420 and 430 in synchronism with the phase voltages on lines L1, L2, and L3, as described above.

Conclusion

To overcome the shortcomings of conventional gating circuits, circuits consistent with the present invention eliminate the need to separately control the timing of the gate current drive by sensing the anode-to-cathode a-c voltage of the SCR. In this way, the gate current is automatically turned off while the anode-to-cathode a-c voltage goes negative during negative half-cycles and is automatically turned on when the anode-cathode a-c voltage approaches each positive half cycle of an a-c power source. It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

We claim:

1. A gate drive circuit for gating a silicon controlled rectifier (SCR) connected in an a-c power circuit, comprising:

a d-c voltage source;

a driver circuit for producing a gate drive current, when connected to the d-c voltage source, to trigger the SCR into conduction; and a switching circuit including a switch connected between the d-c voltage source and the driver circuit and a voltage divider network connected between the d-c voltage source and the SCR, the switching circuit operating to control the switch such that the switch is closed when the anode-to-cathode a-c voltage reaches a positive value and the switch is open when the anode-to-cathode voltage reaches a negative value.

2. The gate drive circuit of claim 1, wherein the driver circuit includes a voltage regulator for developing a constant gate drive circuit.

3. The gate drive circuit of claim 1, wherein the voltage divider network includes a control node, and the switching circuit further includes:

a switching device connected to the control node and the switch for opening and closing the switch in accordance with a voltage appearing on the control node.

4. The gate drive circuit of claim 3, wherein the voltage divider network further includes:

a first diode poled to block the control node from sensing a positive anode-to-cathode voltage of the SCR.

5. The gate drive circuit of claim 4, wherein the voltage divider network further includes:

a second diode connected to clamp the control node at a turn-on voltage while the first diode blocks the control node from sensing the anode-to-cathode voltage, the switching device closing the switch in response to the turn-on voltage.

6. The gate drive circuit of claim 5, wherein the switch is a first semiconductor device and wherein the switching device includes:

a second semiconductor device that is rendered conductive by the turn-on voltage on the control node to develop a turn-on voltage for the first semiconductor device.

7. The gate drive circuit of claim 6, wherein the first and second semiconductor devices are MOSFETs.

8. A gate drive circuit for gating a silicon controlled rectifier (SCR) connected in an a-c power circuit, comprising:

a d-c voltage source;

a driver circuit for producing a gate drive current, when connected to the d-c voltage source, to trigger the SCR into conduction; and a switching circuit including:
  a first semiconductor switch connected between the d-c source and the driver circuit;
  a voltage divider network connected between the d-c voltage source and the SCR, the voltage divider network including:
    a control node;
    a first diode poled to block the control node from sensing a positive anode-to-cathode a-c voltage across the SCR and to communicate a negative anode-cathode voltage to the control node; and
    a second diode connected to clamp the control node at a turn-on voltage while the first diode blocks the control node from sensing the anode-to-cathode voltage; and
  the switching circuit further including a second semiconductor switch connected to the d-c voltage source and the control node for producing a turn-on voltage to close the first semiconductor switch in response to the turn-on voltage on the control node and to open the first semiconductor switch while the first diode communicates the negative anode-cathode voltage to the control node.

9. A gate drive circuit for gating a silicon controlled rectifier (SCR) connected in an a-c power circuit, comprising:

a d-c voltage source;

a driver circuit for producing a gate drive current, when connected to the d-c voltage source, to trigger the SCR into conduction; and a switching circuit including a voltage divider network connected between the d-c voltage source and the SCR, the switching circuit controlling the connection of the driver circuit to the d-c voltage source such that the driver circuit is connected to the d-c voltage source when a control node of the voltage divider network senses that an anode-to-cathode voltage of the SCR reaches a positive value and controlling the disconnection of the driver circuit from the d-c voltage source such that the driver circuit is disconnected to the d-c voltage source when the anode-to-cathode voltage reaches a negative value.

10. The gate drive circuit of claim 9, wherein the voltage divider network further includes:

a first diode poled to block the control node from sensing a positive anode-to-cathode voltage of the SCR.

11. The gate drive circuit of claim 10, wherein the voltage divider network further includes:

a second diode connected to clamp the control node at a turn-on voltage while the first diode blocks the control node from sensing the anode-to-cathode voltage, the switching device connecting the driver circuit to the d-c voltage source in response to the turn-on voltage and disconnecting the driver circuit from the d-c voltage source while the control node voltage is other than the turn-on voltage.

* * * * *